United States Patent [19]
Atkinson

[11] Patent Number: 4,555,645
[45] Date of Patent: Nov. 26, 1985

[54] MOVEABLE COIL LINEAR MOTOR
[75] Inventor: Robert W. Atkinson, Dover, Ohio
[73] Assignee: Snyder Laboratories, Inc., Dover, Ohio
[21] Appl. No.: 581,514
[22] Filed: Feb. 21, 1984

Related U.S. Application Data
[63] Continuation of Ser. No. 445,792, Dec. 1, 1982, abandoned.

[51] Int. Cl.$^4$ .............................................. H02K 33/00
[52] U.S. Cl. .......................................... 310/27; 310/13
[58] Field of Search ..................................... 310/13, 27

[56] References Cited
U.S. PATENT DOCUMENTS

| | | | |
|---|---|---|---|
| 3,417,268 | 12/1968 | Lace | 310/27 X |
| 3,439,198 | 4/1969 | Lee | 310/27 X |
| 3,666,977 | 5/1972 | Helms | 310/27 X |
| 4,220,878 | 9/1980 | Asano | 310/27 X |

Primary Examiner—Donovan F. Duggan
Attorney, Agent, or Firm—Paul David Schoenle

[57] ABSTRACT

A linear motor comprising a moveable coil, a stationary core in which the coil moves, and a drive member including a shaft and a bearing, the shaft moveable in the bearing and passing through the core. In the preferred embodiment, the drive member includes a pair of circular plates connected by three shafts that slide in bearings passing through the motor core, with the coil attached to the periphery of one of the plates. Springs having varying coil spacing are seated between the plates and the motor core to damp the motor's motion, with the strongest damping at the ends of its reciprocating stroke.

6 Claims, 4 Drawing Figures

MOVEABLE COIL LINEAR MOTOR

BACKGROUND OF THE INVENTION

This is a continuation of application Ser. No. 445,792, filed Dec. 1, 1982, now abandoned.

1. Field of the Invention

The invention in general relates to the field of electrical motors, and more particularly to a motor having a coil that moves linearly in a reciprocating motion.

2. Description of the Prior Art

Linearly reciprocating motors (that is, motors in which the moving element moves back and forth along a line) having moving coils have been known since the earliest days of electrical motors. See for example, U.S. Pat. No. 524,044 issued Aug. 7, 1894 to Frank W. Merritt and Arthur R. Roe, which describes an electrical pump. However, as the art of electrical motors developed the linear motor disappeared from uses requiring substantial forces, such as in liquid pumps. At the present time, the use of moving coil linear motors is generally limited to functions requiring rapid response and small forces. Typical modern applications are in loudspeakers, or the movement of magnetic heads or pens in information processing systems. See for example, U.S. Pat. No. 3,917,987 issued to Yuji Inoue. Moving coil type linear motors used for functions requiring significant forces generally have been extremely large motors. For example, the moving coil motor disclosed in U.S. Pat. No. 3,863,082 issued to Donald H. Gillott et al. requires a motor occupying a volume of more than 1,600 cubic inches to provide a maximum force of about 46 pounds.

U.S. Pat. No. 2,669,937 issued to Shelley Presentey, on Nov. 8, 1950 describes a loudspeaker type linear motor, ostensibly to be used for pumps and ostensibly rugged in design. However, no performance characteristics are given, so it is not known whether this motor solved the problem of relatively large size associated with powerful moving coil linear motors. Further, the disclosure of the Presentey patent explicitly calls for elimination of all mechanical members such as shafts, journals, bearings and the like, which as will be seen below is directly contrary to the present invention.

SUMMARY OF THE INVENTION

It is an object of this invention to provide a moving coil linear motor that produces relatively large forces and yet is relatively small; for example a motor that can produce up to 300 pounds per square inch of force and takes up a volume of about 85 cubic inches.

It is another object of the invention to provide a motor of the above size that is rugged enough to be used for pumping water continuously for long periods.

It is a further object of the invention to provide a linear motor that also operates very quietly, in addition to the above features, so that it can be used for example in the quietest hospital environments.

It is yet a further object of the invention to provide a linear motor that includes one or more of the preceeding objects and is very efficient.

The invention provides a linear motor having a moveable coil, a stationary core, and a drive member which includes a shaft and a bearing, the shaft being moveable in the bearing and passing through the core, the coil being connected to the drive member. Preferably the shaft passes through the coil and the drive member includes a circular plate connecting the coil and the shaft. In the preferred embodiment there are three shafts and three bearings, and the drive member includes a first plate to which the coil and one of each of the shafts are connected, and a second plate to which the other ends of the shafts are connected, with the shafts and bearings being spaced apart along a circle about the axis of the coil. Preferably the motor includes a variable damping means, for example a coil spring with varying coil spacing. In the preferred embodiment the motor includes a pair of such coil springs, one spring of each pair extending between the first plate and the motor core, the other spring of each pair extending between the second plate and the motor core. Preferably the drive member is made of a material that is lightweight and conducts heat well, such as aluminum.

The motor of the invention has a number of synergistic features. For example, the design of the drive member not only provides significant additional stability to the motor, but also provides significant cooling function to the motor, since the aluminum shafts which pass through the motor interior carries away the heat of the motor, and the plates act as excellent radiators and also contribute a fanning effect. This significantly increases the ability of the motor to handle large amounts of power and to do correspondingly large amounts of work without over heating. The increased cooling means that there will be less expansion and distortion in the motor, and thus permits closer tolerances, which in turn permits the moving coil and the stationary core to be closer together than in previous linear motor, thus increasing their interaction, and further increasing the efficiency and power of the motor.

Numerous other features, objects, and advantages of the invention will now become apparent from the following detailed description when read in conjunction with the accompanying drawings, in which:

DESCRIPTION OF THE PREFERRED EMBODIMENT

Figure 1:
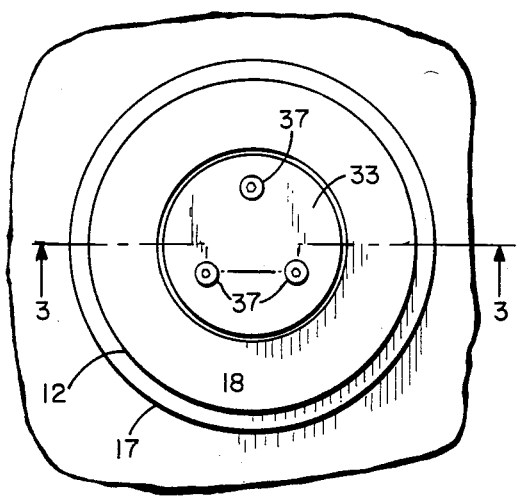
FIG. 1 is a top view of the preferred moving coil linear motor according to the invention.
Figure 2:
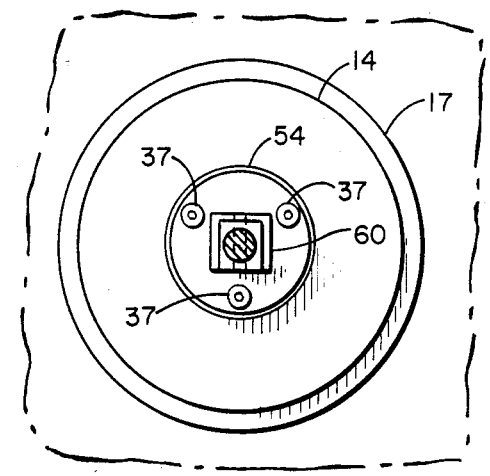
FIG. 2 is a bottom view of the motor of FIG. 1.
Figure 3:
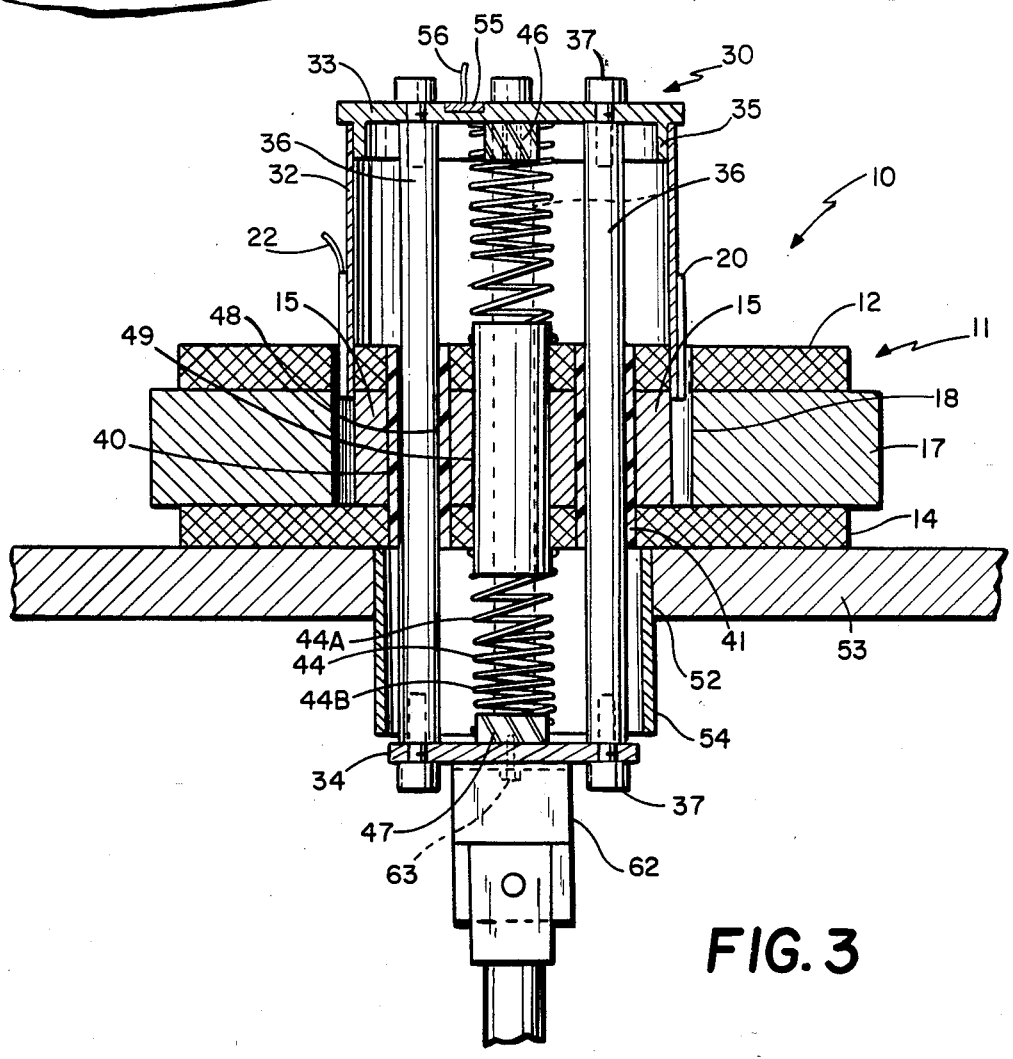
FIG. 3 is a cross-sectional view of the motor of FIG. 1, taken along lines 3—3.

Referring to FIGS. 1-3, the preferred embodiment of the linear motor is shown. A top view of the motor is shown in FIG. 1, a bottom view in FIG. 2 and a cross-sectional view in FIG. 3. Motor 10 comprises a core 11, a moveable coil 20, and a drive member 30. Core 11 includes a magnetically permeable top plate 12, a magnetically permeable bottom plate 14, an inner magnetically permeable core 15 and a permanent magnet 17. Coil 20 moves in a cylindrical slot 18 between magnet 17 and inner core 15. Drive member 30 comprises coil support 32, a pair of connecting members 33 and 34 in the form of circular plates, shafts 36 and screws 37. Coil 20 is attached to cylindrical coil support 32 which in turn is attached to a ring-shaped flange 35 extending from the bottom of upper connecting plate 33. Upper plate 33 is secured to lower plate 34 by the three shafts 36 by means of screws 37. Shafts 36 are moveable in bearings 40 which seat in cylindrical bores 41 through core 11. Variable damping means comprising coil springs 44 seat between the core 11 and connecting plates 33 and 34. Spring alignment bosses 46 and 47 are attached to the center of connecting plates 33 and 34 respectively and spring alignment post 49 seats in a cylindrical bore 49 through the center of core 11. One end of the springs 44 fits around the bosses 46 and 47 and the other end fits around the post 48 to maintain the spring in alignment. Springs 44 are helical coil springs with varying coil spacing; that is, the coil spacing at one portion 44A of each spring 44 is different than the coil spacing at another portion 44B of the same spring 44. The spacing is chosen so that the motor 10 will have a biasing force toward the center position which varies along the excursion path of the drive section 30 in a predetermined manner. The motor is attached to flange 62 by screw 63. Flange 62 provides for the attachment of the motor 10 to a pump, or other machine to be driven, as shall be described below. The motor 10 sits in a cylindrical hole 52 in housing 53. Cylindrical housing 54 surrounds the lower part of drive member 30. A thermistor 55, is encapsulated in epoxy and bolted to the top plate 33 and is connected to electronic circuitry by braided wires 56. Coil 20 is connected to the electronic circuitry by braided wires 22.

Figure 4:
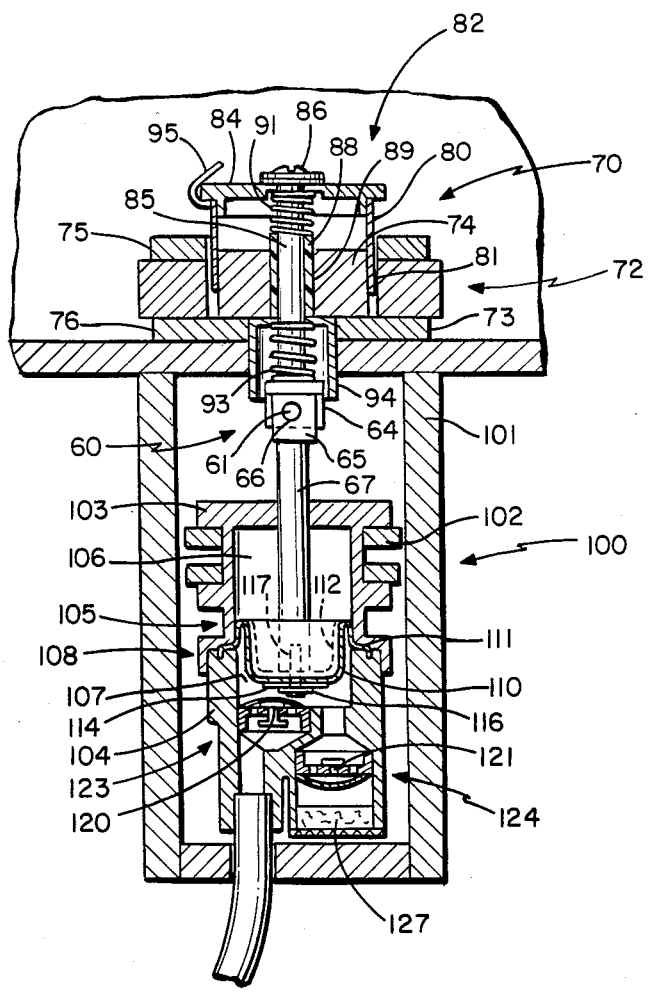
FIG. 4 is a (cut-away) sectional view of an alternative embodiment of the motor according to the invention also showing an example of a pump which the motor has been used to operate.

Referring to FIG. 4 an alternative embodiment of a motor 70 according to the invention is shown, connected to a pump 100. The pump 100 is illustrative of an application to which the motor has been applied. Motor 70 comprises a coil 80 and a core 72. Coil 80 is fixed to drive member 82 of motor 70. Core 72 comprises an outer permanent magnet portion 73, an inner non-magnetized but magnetically permeable portion 74, a magnetically permeable top plate 75, and a magnetically permeable bottom plate 76. A cylindrical slot 81 is formed within core 72, and coil 80 moves within this slot. Drive member 82 comprises connecting member 84 in the form of a circular plate and shaft 85. Plate 84 is attached to shaft 85 by screw 86. A hollow cylindrical bearing 88 fits into a cylindrical bore 89 in core 72 and shaft 85 slides within bearing 88. The portion of shaft 85 that slides in bearing 88 is a journal. A damping means comprising helical coil spring 91 is located on shaft 85 with the axis of the spring corresponding to the axis of the shaft, and with one end of the spring seating against plate 84 and the other end of the spring seated against bushing 88. Similarily the coil spring 93 fits coaxially about the bottom of the shaft 85 and seats between the top of flange 64 and a spring enclosure 94 which may form an integral part of bushing 88. It is noted that the springs 91 and 93 will function properly as long as one end is seated against a portion of the motor 82 that is moveable with the coil 80 while the other end is seated against a portion of the motor which is fixed to the core 72. Thus, in the context of providing a seat for the springs 91 and 93, bushing 88 may in this embodiment be considered to be part of the motor core 72. Coil 80 is electrically connected to electronic circuitry by means of braided wires 95. It is noted that the housing 101, including pump supports 102 is a means for supporting the motor 70 and pump 100 in a stable relationship, so that the motor 70 can drive the pump.

Referring to the lower part of FIG. 4 a suction pump for use in a lavage system is shown. The pump and lavage system are described in detail in a companion patent application, and will only be described briefly here, since they are included only as an example of the application of the motor and do not form part of the invention.

The pump 100 includes a pump body 108 having an upper portion 103 and a lower portion 104 which enclose a cylindrical chamber 105 which is divided into a upper portion 106 and a lower portion 107 by a diaphragm 110. Diaphragm 110 includes an outer lip 111 which is secured between the two housing portions 103 and 104. The center part of diaphragm 110 is sandwiched between a cup 112 and washer 114 and the assembly is secured to rod 67 by a screw 116 which screws into a threaded hole 117 in the end of rod 67. Inlet umbrella valve 120 and outlet umbrella valve 121 seat in inlet and outlet ports 123 and 124 respectively of chamber 105. Filter 127 seats in the lower portion of the outlet port 124. Motor 82 is connected to pump 100 by a coupling 60. Coupling 60 consists of a pin 61 and a pair of flange sections 64, 65 associated with the motor 70 and pump 100 respectively. Pin 61 is located on the motor flange 64 and inserts into a hole 66 in the pump flange 65. Flange 65 is connected to a piston rod 67 which is the driven member of the pump.

The lavage system into which the motor has been incorporated includes a suction pump, such as pump 100 shown in FIG. 4, and a pump which is used to produce a pulsatile stream of fluid having an average pressure of up to 30 lbs. psi. Both pumps are driven by motors as disclosed herein.

The materials from which the various parts of the invention are made are for the most part evident from the functions; we shall briefly review the preferred materials, although it should be understood that many other suitable materials could be used. The materials shall be discussed in terms of the preferred embodiment of FIGS. 1-3; materials of the embodiment of FIG. 4 will be clear by analogy. The moving coil 20 can be purchased already mounted on cylinder 32 from a source of acoustic speaker parts, such as Quam Nichols, Marquette Rd. and Prairie Ave., Chicago, Ill. 60637. Cylinder 32 to which the coil is attached is a piece or thin (about 0.005 in.) aluminum. Connecting members 33 and 34 are made of aluminum, and cylinder 32 is attached to member 33 by an epoxy adhesive, such as 3M TM brand No. 2214 regular. Shafts 36 are made of aluminum while bushings 40, bosses 46 and 47, and post 49 are made of TEFLON TM polytetrafluoroethylene. Springs 44 may be made of stainless steel, music wire or other suitable wire. The various screws such 37 are preferrably made of stainless steel. Magnet 17 is a ceramic magnet and plates 12 and 14 are made of a permeable steel. Housing parts 53 and 52 are preferably made of aluminum for heat dissipation purposes, but also may be made of fiberglass, ABS plastic, etc. as desired. Braided wire 22, 56, and 95 is made of a rope-like fabric that is impregnated with a conductive metal, such as No. P-1603 lead wire available from The Montgomery Company, Canal Bank, Windsor Locks, Conn. 06096.

The moving coil motor is generally known to be a very responsive motor, which is due to the fact that is has relatively small inertia in its moving parts. The motor of the present invention retains much of the responsiveness of the moving coil motor since the parts of the drive members 30 and 82 are made of material that is extremely light in weight compared to the moving magnets of other types of motors. In addition, the invention provides a number of other advantageous features not found in prior art moving coil linear motors.

The springs 44, 91, and 93 provide a restoring force to the motor which is quite significant at the ends of its reciprocal motion. At these end points of the motion the power developed by the motor is a minimum; the restoring force of the springs assist the motor in moving back towards its central position where the power is larger. In this way the motor overcomes the tendency of prior art moving coil linear motors to stall at the end of its stroke, or to have difficulty starting if it stops at the end of a stroke. There is some disadvantage to springs performing this function however, in that they also oppose the motion of the motor in the central position. The varying coil springs significantly increase the restoring force at the ends of the stroke, while at the same time reducing the restoring force at the central part of the stroke. The addition of the variable damping springs also permits the motor to handle large amounts of electrical power, and produce correspondingly high mechanical power, without slamming up against the end stops, which would be quite noisy, and would ultimately damage the motor. This feature results in a much more powerful yet quieter running and more reliable motor than previous linear motors. Further, the springs permit longer excursions of the stroke of the motor leading to more control of the volume pumped by the motor, and more cooling effect (the cooling effect shall be discussed below).

The addition of the shafts and bearings in the motor greatly increases the stability of the motor. The stability is particularly noted under heavy load, a condition which in prior art moving coil linear motors results in rubbing of the coil in its slot. Thus the use of the journal permits the use of a much narrower slot for the coil to move in, which increases the power available from the motor because it keeps the magnetic fields of the coil and core close together, thus increasing their interaction.

The structure of the drive members 30 and 82 also contributes to the ability of the motor to handle large loads in an additional manner. The shafts 36 and 85 act as a cooling means for the motor. The aluminum out of which they are made is a very good heat conductor. Since the plates 33 and 34 are in close contact with their respective coils 20 and 80 and the shafts are in close contact with the motor cores 17 and 73 through the bearings 40 and 88 respectively, they serve to dissipate the heat produced in the coil and the core. The plates 33, 34 and 84 are excellent heat radiators. Their motion creates a fanning effect both on the plates themselves and on the motor core and coil. The end result is reduced and uniform temperatures throughout the motor which also contributes to the ability to maintain close moving tolerances. This self-cooling effect of the motor also enables the motor to be run without a cooling fan in most circumstances, which contributes to the quietness of the motor.

The use of three shafts in the preferred embodiment increases the cooling effect of the shafts and also prevents rocking or canting of the coil under heavy loads, again contributing to close tolerances. The design, particularly the fact that the shafts 36, 85 pass through the cores 17, 22 provides a very compact motor. The compactness leads to the scaling down of the supports, housing and related parts of the system, which makes the motor much more portable, and also enables it to be used in situations, such as surgery, where the large motors of the prior art were not appropriate.

The combination of the various features of the invention discussed above results in a highly efficient motor. The efficiency not only provides for increased power at lower cost, but also reduces the heat output of the motor which in prior art motors could be a significant liability. This efficiency also contributes to the increase in power for a given motor size. As for example, one embodiment of the motor having a total volume of only about 82 cubic inches (including the drive member) has demonstrated an ability to produce a water stream having an output pressure of 30 pounds per square inch for an indeterminate length of time.

A novel moving coil linear motor that is unusually small, powerful, and efficient and has numerous other features and advantageous has been disclosed. While the above description of the invention has been referenced to a few particular embodiments, it is evident that, now that the advantages of a linear motor having journals that pass through the motor core, a variable damping system, and the other features disclosed, those skilled in the art can now make numerous uses of, modifications of, and departures from the specific embodiments described herein without departing from the inventive concepts. For example, the magnets 17 and 73 could be replaced with any means for producing a constantly polarized magnetic field while the motor is running, such as an electromagnet; other variable damping means could be substituted, for example, springs with the varying wire thickness, or springs with a varying coil diameter (conical springs) could be used; other drive means having the features disclosed could be substituted. Many other materials could be substituted for those used in the preferred embodiment. Consequently, the invention is to be construed as embracing each and every novel feature and novel combination of features within the appended claims.

What I claim is:

1. An alternating current linear motor comprising:
   a coil support;
   a moveable coil attached to said coil support;
   a stationary core including a bearing; and
   a drive member spaced from said coil and connected to said coil support, said drive member comprising a shaft, said shaft being moveable in said bearing and passing through the core, said coil support being connected to said shaft at a first location on one side of said core, said shaft being connected with a device to be powered by said motor at a second location on the opposite side of said core, and said moveable coil and said coil support remaining spaced from the opposite side of said bore so as to be compactly arranged on the one side of said core, and said stationary core defining a slot surrounding said bearing to movably receive said moveable coil therein.

2. The motor of claim 1 wherein there are three shafts and three bearings.

3. The motor of claim 2 wherein said drive member further comprises;
   a first connecting member to whcih said coil and one end of each of said shafts are connected;
   a second connecting member to which the other end of said shafts are connected; and
   said shafts and said bearings being spaced apart along a circle about the axis of said coil.

4. The motor of claim 3 and further comprising a pair of coil springs having varying coil spacing, one spring of each pair extending between said first connecting member and said motor core, and the other spring of each pair extending between said second connecting member and said motor core.

5. The motor of claim 1 and further comprising a means for variably damping the motion of said coil, said means providing minimum damping when the coil is positioned at the center of its reciprocating path and providing maximum damping when the coil is located at the end of its stroke in either direction.

6. The motor of claim 5 wherein said means for damping comprises at least one coil spring having varying coil spacing.

* * * * *